(12) United States Patent
Pintsov

(10) Patent No.: US 11,829,706 B1
(45) Date of Patent: Nov. 28, 2023

(54) DOCUMENT ASSEMBLY WITH THE HELP OF TRAINING DATA

(71) Applicant: David Pintsov, San Diego, CA (US)

(72) Inventor: David Pintsov, San Diego, CA (US)

(73) Assignee: Ancora Software Inc., San Diego, CA (US)

( * ) Notice: Subject to any disclaimer, the term of this patent is extended or adjusted under 35 U.S.C. 154(b) by 0 days.

(21) Appl. No.: 17/853,318

(22) Filed: Jun. 29, 2022

(51) Int. Cl.
*G06V 30/414* (2022.01)
*G06V 30/418* (2022.01)
*G06F 40/114* (2020.01)

(52) U.S. Cl.
CPC .......... *G06F 40/114* (2020.01); *G06V 30/414* (2022.01); *G06V 30/418* (2022.01)

(58) Field of Classification Search
CPC .... G06F 40/114; G06V 30/414; G06V 30/418
USPC .......................................... 715/251; 382/190
See application file for complete search history.

(56) References Cited

U.S. PATENT DOCUMENTS

| | | | | |
|---|---|---|---|---|
| 8,831,361 B2* | 9/2014 | Pintsov | ................ | G06V 30/418 382/209 |
| 10,607,115 B1* | 3/2020 | Pintsov | ................ | G06V 30/414 |
| 2005/0134935 A1* | 6/2005 | Schmidtler | ............. | G06F 40/10 358/448 |
| 2011/0145178 A1* | 6/2011 | Schmidtler | ............. | G06N 20/00 706/20 |
| 2013/0236111 A1* | 9/2013 | Pintsov | ................ | G06V 30/418 382/224 |
| 2015/0269245 A1* | 9/2015 | Schmidtler | ....... | G06F 16/24578 707/748 |

OTHER PUBLICATIONS

Mauritius et al. (Automatic Document Separation: A Combination of Probabilistic Classification and Finite-State Sequence Modeling, published 2007) (Year: 2007).*
ABBYY, (How to Separate Documents using Barcodes—ABBYY FineReader Server, published by YouTube on Mar. 10, 2020) (Year: 2020).*

* cited by examiner

*Primary Examiner* — Stephen S Hong
*Assistant Examiner* — Ahamed I Nazar

(57) ABSTRACT

An automated method for assembling common commercial documents such as invoices, bills of lading and purchase orders placed in multipage files containing multiple documents without separators is described. The method is applicable in the presence of attachments and utilizes training data consisting of fields of interest and their locations in documents together with invariant fields frequently present in documents.

3 Claims, 2 Drawing Sheets

ABC Inc,
999 Main Street South
Springfield, IL 62701

XYZ Ltd,
543 Mountain Road
San Diego, CA 92335

Invoice Number A2312007
Invoice Date 08.07.2011

101

Invoice

102

| Qty Ordered | Qty shipped | Product Code | Unit Price | Extended Price |
|---|---|---|---|---|
| 1 | 1 | 1256 | 2.43 | 2.43 |
| 2 | 2 | 3248 | 11.99 | 23.98 |

Total 26.41

Page 1 of 1

*FIG. 1*

DOCUMENT ASSEMBLY WITH THE HELP OF TRAINING DATA

FIELD OF INVENTION

The present invention describes a method and system for an automatic document assembly from a plurality of electronic documents (e.g. in TIFF, PDF or JPG formats) found in a multipage electronic file without separators used to split individual documents. The source of electronic documents could be accounting systems, enterprise resource management software, accounts receivable management software, etc.

BACKGROUND OF THE INVENTION AND RELATED ART

The number of documents that are exchanged between different businesses is increasing very rapidly. Every institution, be it a commercial company, an educational establishment or a government organization receives hundreds and thousands of documents from other organizations every day. All these documents have to be processed as fast as possible and information contained in them is vital for various functions of both receiving and sending organizations. It is, therefore, highly desirable to automate the processing of received documents. Typically, commercial documents such as invoices, purchase orders, bills of lading and others are created by a software program that generates them as electronic files which can be either sent electronically to their recipients or printed on paper and mailed. The first option is rapidly becoming the option of choice. In both cases the electronic files containing documents frequently have multiple multipage documents. An additional complication is potential presence of attachments which can take many forms such as customer correspondence, previously supplied invoices, etc. The layouts of these attachments are unpredictable.

A standard method used for separation of documents in multipage TIFF files obtained by scanning paper documents is to insert specific separator sheets between paper documents prior to scanning. This method requires considerable mechanical handling of paper prior to scanning and the removal of separators upon completion of scanning making it rater laborious. In addition, the separators normally have a barcode placed on them, the barcode have to be found and read to detect the separator image. Failure to read the barcode creates a wrong document assembly.

The present invention discloses an automatic method of assembling documents, that is splitting multi-document multipage files into their constituent documents.

In automated processing of commercial documents, the receiver of these documents is facing a task of identifying individual documents in the stream of multiple documents received. For instance, a vendor may send a multipage PDF file that contains multiple multipage invoices with attachments. Or a buyer may send a multipage set of purchase orders. If the documents are received in paper form the processor of these frequently scans batches of paper documents so that the processing system is facing the task of splitting multiple pages into individual documents and separating attachments which are normally not processed.

A simplified commercial invoice is illustrated in FIG. 1, where element 101 shows the type of document, in this case invoice, and element 102 is a table showing line items with their quantities and prices. There are no accepted standards governing layouts and the type of information present in commercial documents, so they can be of arbitrary complexity in terms of their layouts. Typically, each originator/vendor utilizes documents of their own design. The layout of a multipage document may exhibit considerably different designs of first and subsequent pages.

The task of obtaining individual documents out of multipage multi-document file is called document assembly.

There are several methods that can be used to approach the problem. For example, one can train a deep learning model to attempt to separate the individual documents, or similarly to speech recognition one can train a Markov model.

The approach described in this disclosure is to take advantage of the layouts of the documents and assemble documents on the basis of the training data for all originators of documents. So, the motivation for this approach is the presence of accurate training data that would allow an accurate document assembly such as splitting of multiple invoices into individual document. The input to the process is a multipage file (say, in PDF or TIFF format) containing multiple documents potentially with attachments, the output is a set of individual documents with their constituent pages and attachments identified as such.

SUMMARY OF THE INVENTION

A method for assembling documents from their constituent pages in the presence of training data that reflects the layouts of documents is described. The method allows splitting individual documents from a multipage multi-document file having no special separators of documents.

BRIEF DESCRIPTION OF THE DRAWINGS

FIG. 1 is an illustrative representation of a typical class of documents that are subject of the present invention.

DETAILED DESCRIPTION OF THE PREFERRED EMBODIMENT

Figure 2:
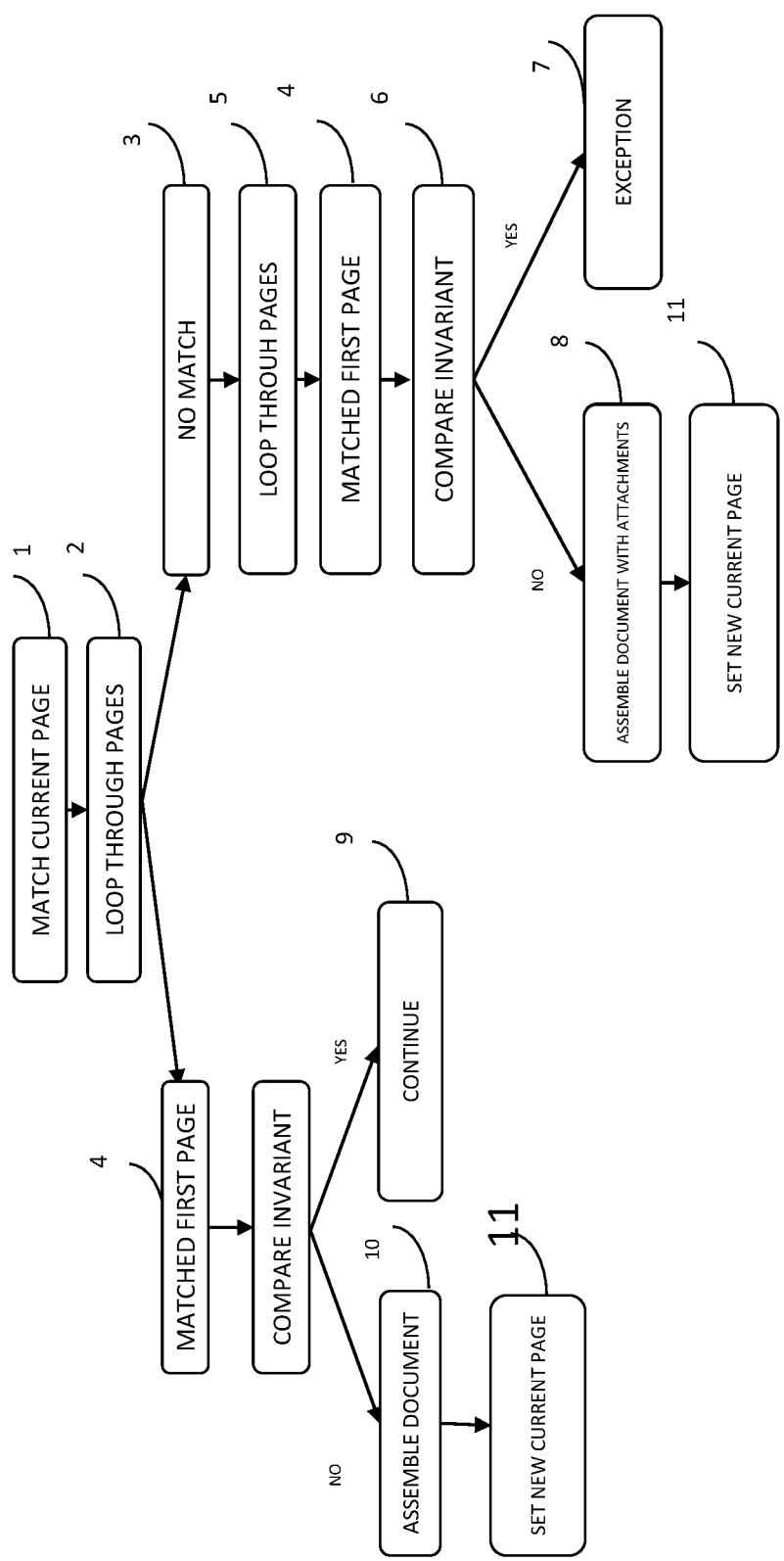
FIG. 2 the flowchart of the process of document assembly.

The layout of a page of a document is defined in U.S. Pat. No. 8,831,361 which is incorporated as a reference herein. For the purposes of this invention the layout is appended by locations and values of fields of interest to form training data. For example, in case of purchase orders the fields of interest are the purchase order number, its date, the total amount of order, the name and address of its creator.

The process assumes that for each page of multipage documents except attachments the training data exist and have been matched and applied before the assembly takes place, so the fields of interest in the pages are automatically captured. It obviously assumes that the training data exist for all sources of documents. If a page can't match any training data with sufficient confidence it is deemed to be an attachment page. The training data exist for three potentially different layouts for each document originator: first page, middle page, last page. Each valid page has one of these layouts.

It is assumed, which is almost always the case, that the pages of documents precede attachments to each document, which in turn are followed by the first page of the next document. The present invention can be adapted to the situation when all the pages of a multi-document file are randomly shuffled but this complication is not encountered in practice.

The training data for a given originator/layout of each page is obtained during the first pass processing of documents when a human user corrects, if needed, the automatic capture of data. The captured data that is used for each document is any invariant field, that is the field whose value remains the same in a given multipage document and only in it. This invariant field is typically the invoice number or the bill of lading number or the purchase order number. If there are more than one invariant field the system can capitalize on any or all of them. Coinciding invariant fields on two documents would indicate duplicate documents detection of which is frequently desirable in practical applications.

The first step according to the preferred embodiment of the present invention is setting the current page of the process to be the first page of the file.

Then the following steps are performed:
1. Match the current page of the multipage file to training data.
2. Loop through matching the next pages to training data until
3. One of the two following conditions is met
   a. No match is found.
      According to the assumptions stipulated above, the current page is a first page of an attachment. Loop through the next pages until a page matches a first page of a document. If no page matches the first page of a document, stop. All the pages between the first page of the attachment and the last non-matched page are deemed to be attachments. Assemble the document and attachments. If a current page matches the first page of a document compare the invariant field value of this document with the invariant field value of the current document. If these values differ assemble all the pages between the first page of the current document and the first page of the attachment into one document and attach all the pages between the first page of the attachment and the last non-matched page. If these values are the same an exception condition has occurred since first pages of documents are assumed to have a unique invariant. If one or both of these invariant field values do not exist or could not be captured the document still can be assembled as described. Normally, a new document follows the attachments.
   b. A match to a first page of a document is found. This could be a first page of a new document.
      Compare the invariant field value of this document with the invariant field value of the current document. If these values differ assemble all the pages between the first page of the current document and the first page just found into one document. In some cases the middle pages of documents have exactly the same layout as first pages. In these cases the invariant field is the same, so the process continues to the next page. If one or both of these invariant field values do not exist or could not be captured the document still can be assembled as described.
4. Set the current page in step 1 with just found new first page and repeat steps 1-3 until all the pages of the multi-document file are processed.

FIG. 2 shows a flowchart of the disclosed method where element 1 corresponds to the first step of the process, namely matching the first page of the file to be split into individual documents. The main loop of processing all the pages in the file is depicted in element 2. The two key branches on the left and right of the diagram correspond to documents without attachments on the left and documents with attachments on the right. Elements 3-11 illustrate the decision branching.

The matching process assigns a confidence value for each act of matching. All matching described above assumes that confidence thresholds have been selected for each matching outcome and all matches are above corresponding confidence thresholds. If a page can't be matched to existing training data new training data can be created for that page. Depending on the layouts of the documents each layout may have its own matching confidence threshold, more complex layouts may have lower confidence thresholds while simpler layouts may have higher confidence thresholds. These thresholds can be optimized on the basis of experiments with successful outcomes versus those with incorrect assembly. In the method described above the use of invariant field values serves as confirmation of the correct assembly and increases an overall confidence of the boundaries of the documents.

Frequently multipage documents contain descriptions "page 1", "page 2", etc. or "page 1 of 2", "page 2 of 3", etc. These descriptions can also be captured as part of training data and utilized to increase the confidence of page assignment and as confirmation of the page assignment.

In modern document processing such as invoice processing in accounts payable the documents from vendors frequently come as multipage PDF files containing documents only from a single origin/vendor. The matching process in this case can be significantly simplified and accelerated by using the training data only from the same single source. The documents arrive frequently via e-mail and if a mapping between the source of the documents and the training data for that single source documents can be established then the matching process would involve only a single source training data.

The described process can be adapted to a complex case when attachments can have the same layout and purpose as the documents themselves. A model example of this situation is the case in which the vendor attaches to a multipage invoice a number of earlier invoices of the same layout. In this case the method described above will detect the first page of another invoice instead of identifying that first page as an attachment. If the training data is designed (as is usually the case) to capture the date on the documents, an additional checking of the date on every document/invoice and comparing the date on the current document with the date on the first page of the detected invoice would permit to establish that the current document is more recent thus assigning the detected invoice to be an attachment. If, for instance, the date on one invoice is several months older than that on the other one the older invoice can safely be treated as an attachment. The described method can be used in separating documents of almost identical layouts such as invoices and credit memos with the same originating mechanism.

What is claimed is:
1. A method of automatic document assembly from multi page multi-document files of a single originating source containing no separator images using computer performing the steps of:
   obtaining in a first pass the training data for all pages of the documents to be processed, said training data consisting of layouts, locations and values of fields of interest for each source of documents;

said layouts are defined as triples (T, L, C) where T is a set of disjoint text blocks present in the document, L is a set of pre-printed geometric lines in the document both vertical and horizontal, and C is a set of text strings representing the contents of all text blocks T;

matching in a second pass said training data to the pages of the multi-document file of the same origin as the training data to be assembled into individual documents;

automatically assembling each document from its constituent pages, by creating a single document consisting of all matched pages together with attachments labeled as such;

said attachments are defined as documents or document pages attached to the documents to be processed and having unpredictable layouts different from the layouts of documents to be processed.

2. The method according to claim 1 that additionally incorporates document invariant fields for validation of integrity of the assembled documents by comparing the invariant fields of the matched pages, said invariant fields are fields whose value remains the same in a given multipage document and only in it.

3. The method according to claim 1 that for validation of integrity of the assembled documents additionally incorporates in the training data document pagination located in the document.

\* \* \* \* \*